(12) United States Patent
Okada et al.

(10) Patent No.: US 6,431,018 B1
(45) Date of Patent: Aug. 13, 2002

(54) GUIDE DEVICE FOR WIRING MEMBER AND/OR PIPING MEMBER AND ROBOT WITH GUIDE DEVICE

(75) Inventors: Takeshi Okada; Hiroshi Uchida, both of Yamanashi (JP)

(73) Assignee: Fanuc Ltd., Yamanashi (JP)

( * ) Notice: Subject to any disclaimer, the term of this patent is extended or adjusted under 35 U.S.C. 154(b) by 0 days.

(21) Appl. No.: 09/656,419

(22) Filed: Sep. 6, 2000

(30) Foreign Application Priority Data

Sep. 9, 1999 (JP) ............................................ 11-255497

(51) Int. Cl.[7] ........................... B25J 18/00; B25J 19/00; F16L 3/08
(52) U.S. Cl. ................................ 74/490.02; 74/490.06; 248/70; 248/229.22; 414/918; 901/50
(58) Field of Search ..................... 74/490.02, 490.06, 74/502.6; 248/70, 229.22, 286.1, 298.1, 289.11; 414/918; 901/50

(56) References Cited

U.S. PATENT DOCUMENTS

| | | | | |
|---|---|---|---|---|
| 2,509,445 A | * | 5/1950 | Motis ............................ | 248/51 |
| 4,529,352 A | * | 7/1985 | Suzuki et al. ................ | 414/680 |
| 4,705,243 A | * | 11/1987 | Hartmann et al. ............ | 248/51 |
| 4,767,257 A | * | 8/1988 | Kato ........................ | 414/744 A |
| 5,437,207 A | * | 8/1995 | Zimmer .................... | 74/490.02 |
| 5,816,736 A | * | 10/1998 | Kroulik ...................... | 403/389 |
| 5,848,556 A | * | 12/1998 | Ryu et al. ................ | 47/490.02 |
| 6,293,504 B1 | * | 9/2001 | Hartmann .................. | 248/74.1 |

FOREIGN PATENT DOCUMENTS

| | | |
|---|---|---|
| DE | 88 14 906 | 1/1989 |
| DE | 92 17 659 | 4/1994 |
| DE | 297 20 048 | 3/1999 |
| JP | 5-220689 | 8/1993 |
| JP | 7-178693 | * 7/1995 |

* cited by examiner

Primary Examiner—Allan D. Herrmann
(74) Attorney, Agent, or Firm—Staas & Halsey LLP

(57) ABSTRACT

A plurality of clamp devices for clamping a cable or a pipe connected to an end effector of a robot are mounted to a robot wrist portion. A first clamp device has a base and a clamp portion configured to slide linearly with respect to the base and be also capable of turning about an axis perpendicular to the slide direction. A second clamp device has a base and a clamp portion configured to be capable of turning about an axis perpendicular to the installation surface of the base. A third clamp device has a revolving unit fitted to the circumference of the arm and configured to be capable of pivotal motion in the circumferential direction of the arm and a clamp portion provided on the circumference of the revolving unit to be capable of turning about an axis in the radial direction of the revolving unit. The clamp portions of these clamp devices are adapted to clamp the cable or the pipe extending to the end effector.

6 Claims, 8 Drawing Sheets

WRIST SIDE ← → ARM SIDE

GUIDE DEVICE FOR WIRING MEMBER AND/OR PIPING MEMBER AND ROBOT WITH GUIDE DEVICE

BACKGROUND OF THE INVENTION

1. Field of the Invention

This invention relates to an industrial robot, and more particularly, to a guide device for guiding a pipe or a cable connected to an end effector at the tip of a robot wrist.

2. Description of the Prior Art

Generally, in an industrial robot, an end effector suitable for various jobs is mounted to a wrist at the tip of an arm, and a piping member or a wiring member for supply of power and liquid and supply and exhaust of air is connected to the end effector.

FIG. 7 shows the configuration of a six-axis robot as one of industrial robots. The six-axis robot fixed to an installation surface as shown in FIG. 7 is capable of turning by turning axes J1 to J6 at turning angles of $\theta$, W, U, $\gamma$, $\beta$ and $\alpha$. This robot has a wrist 20 at the tip of an arm 10, and an end effector is mounted to the wrist 20.

In the prior art, taps or holes provided in required portions of the robot body for installation of the equipment are used for installation of a cable or like wiring member or a pipe or like piping member connected to the end effector.

FIG. 8A illustrates the installation of the piping member or the wiring member in the prior art. In FIG. 8A, there is shown the state of the piping member or the wiring member attached to the arm and the wrist at the tip of the arm. The wrist 20 has turning axes 21, 22 and 23 connected together, and these turning axes are different from one another in axial direction of turning. An end effector 5 is mounted to one end of the wrist 20 so that it can turn about the turning axis 23 and also can be exchanged. Further, the other end of the wrist 20 is mounted to the arm 10 through the turning axis 21 so that the wrist 20 can turn.

The installation of the piping member or the wiring member is made by means of supporting its intermediate portion with a clamp portion 9 fixed to the arm 10, while holding its end portion in place to a clamp portion 6 fixed to the end effector 5.

According to the installation of the piping member or the wiring member in the prior art, there is a problem in that the wiring member and/or the piping member makes contact with a robot itself or its peripheral equipment to cause wear of the wiring member and/or the piping member, resulting in a need for periodical maintenance.

Generally, when the turning axes of the wrist portion are actuated for wrist motion, the wiring member and/or the piping member moves flexibly with respect to the arm according to the wrist motion. However, in case of a wiring member and/or a piping member of insufficient length, it is not possible to cope with the above flexible motion, resulting in hindrance from carrying out the wrist motion. In this connection, the prior art is configured to meet the flexible motion of the wiring member and/or the piping member by slackening the wiring member and/or the piping member ranging from the arm to the end effector. FIG. 8A shows the installation of the wiring member and/or the piping member slackened.

However, when each turning axis is turned for the wrist motion, the slack of the wiring member and/or the piping member causes contact of the wiring member and/or the piping member with the robot itself or its peripheral equipment. Further, it is feared that the wiring member and/or the piping member gets twisted round the wrist portion to hinder from carrying out the wrist motion, depending on the past motions of the wrist.

Further, the slack of the wiring member and/or the piping member has to be adjusted for each and every robot. Thus, much time is required for the installation of the wiring member and/or the piping member, which is a problem.

FIG. 8B shows how, during one motion, in which turning of the turning axes 21 and 23 causes contact of the slack portion of the wiring member and/or the piping member with the wrist portion, the wiring and/or the piping member can be damaged.

OBJECT AND SUMMARY OF THE INVENTION

It is an object of the present invention to prevent a wiring member and/or a piping member from interfering with a robot itself or its peripheral equipment.

The present invention relates to a device for guiding a wiring member and/or a piping member connected to an end effector at the tip of a robot wrist via a robot arm. This guide device is adapted to attach a cord-shaped body such as a wiring member and a piping member to a robot, more particularly, to an arm and a wrist portion. The cord-shaped body may include only a wiring member or a piping member, or a bundle of both the wiring member and the piping member, or a body formed by housing the wiring member and the piping member in one pipe. Further, each wiring member or piping member may be configured in a bundle of wiring members or piping members or a body formed by housing the wiring members or the piping members in one pipe, without being limited to a single wiring member or a single piping member.

The guide device for the wiring member and/or the piping member according to the present invention comprises a clamp device having a support portion and a clamp portion capable of loose motion with respect to the support portion and adapted to clamp the wiring member and/or the piping member. In mounting the clamp device to the robot, the support portion is disposed on a robot portion, and the direction of loose motion of the clamp portion is placed to cross the drive axis direction of the robot portion, on which the support portion is disposed.

Arrangement of the guide device of the present invention is determined such that the direction of loose motion of the clamp portion and the drive axis direction of the robot portion, on which the support portion is disposed, may cross each other in mounting the clamp device to the robot portion. With the above configuration, when the wiring member and/or the piping member expand and contract with respect to the arm, the loose motion of the clamp portion occurs. The loose motion of the clamp portion makes it possible to displace the wiring member and/or the piping member according to the wrist motion without making contact with the robot or its peripheral equipment. Thanks to the displacement of the wiring member and/or the piping member, the robot may perform a smooth wrist motion.

The robot portion, on which the support portion is disposed, may be an arm, a turning portion or the like, and the loose motion of the clamp portion may include a translation motion and a turning motion. The guide device of the present invention may take various modes on the basis of the robot portion and the state of loose motion. Incidentally, cross angle between the direction of loose motion of the clamp portion and the drive axis direction of the robot portion can be of any degrees, without being limited to right angle. With this cross angle, force applied to the wiring member and/or the piping member as the result of its flexible motion is decomposed into components in the directions of loose motion of the clamp portion, causing the clamp portion to move loosely. Consequently, the wiring member and/or the piping member is prevented from interfering with the robot or its peripheral equipment.

In the first mode of the present invention, a mounting portion of the clamp device is set on the arm side, a base is adapted for the support portion, and the clamp portion to clamp the wiring member and/or the piping member is configured to be guided in a linear direction with respect to the base and is also capable of turning about an axis perpendicular to the slide direction. Then, the base is disposed on the arm with the slide direction of the clamp portion substantially aligned with the longitudinal direction of the arm.

According to the first mode of the present invention, flexible motion of the wiring member and/or the piping member cause the clamp portion to slide and turn with respect to the arm so that the wiring member and/or the piping member are displaced to a position free from interference with the robot and its peripheral equipment according to the wrist motion. Thus, the wiring member and/or the piping member can be prevented from interfering with the robot and its peripheral equipment, permitting a smooth wrist motion.

In the second mode of the present invention, a mounting portion of the clamp device is set on the arm side, a revolving unit capable of loose motion along the circumference is adapted for the support portion, and the clamp portion to clamp the wiring member and/or the piping member is configured to be capable of turning about an axis which connects the revolving center of the revolving unit and the clamp portion. Then, the clamp portion is placed on the arm with the revolving unit disposed on the circumference of the arm.

According to the second mode of the present invention, flexible motion of the wiring member and/or the piping member cause the clamp portion to revolve and turn with respect to the arm so that the wiring member and/or the piping member are displaced to a position free from interference with the robot and its peripheral equipment according to the wrist motion. Thus, the wiring member and/or the piping member can be prevented from interfering with the robot and its peripheral equipment, permitting a smooth wrist motion.

In the third mode of the present invention, a mounting portion of the clamp device is set on the wrist side, a base is adapted for the support portion, and the clamp portion to clamp the wiring member and/or the piping member is configured to be capable of turning about an axis perpendicular to the installation surface of the base. Then, the clamp portion is placed on the wrist or a wrist casing such that the turning axis of the clamp portion may be aligned with or in parallel to the swing axis of the wrist.

According to the third mode of the present invention, flexible motion of the wiring member and/or the piping member cause the clamp portion to turn with respect to the wrist so that the wiring member and/or the piping member are displaced to a position free from interference with the robot and its peripheral equipment according to the wrist motion. Thus, the piping member and/or the wiring member can be prevented from interfering with the robot and its peripheral equipment, permitting a smooth wrist motion.

In the fourth mode of the present invention, a mounting portion of the clamp device is set on the arm side, a movable unit capable of revolution and sliding along a cylindrical surface is adapted for the support portion, and the clamp portion to clamp the wiring member and/or the piping member is configured to be capable of turning about an axis which connects the revolving center of the movable unit and the clamp portion. Then, the clamp portion is placed on the arm with the movable unit disposed on the circumference of the arm.

According to the fourth mode of the present invention, flexible motion of the wiring member and/or the piping member cause the clamp portion to revolve, slide and turn with respect to the arm so that the wiring member and/or the piping member are displaced to a position free from interference with the robot and its peripheral equipment according to the wrist motion. Thus, the wiring member and/or the piping member can be prevented from interfering with the robot and its peripheral equipment, permitting a smooth wrist motion.

Further, the present invention involves a robot having the above guide device. The robot of the present invention includes a robot comprising the guide device according to at least one of the first to fourth modes described above, or may also include a robot, to which a combination of the above modes or all the above modes are applied.

Incidentally, in the guide device of the present invention, the wiring member and/or the piping member can be attached to the translation axis or the turning axis of the robot without being limited to the arm and the wrist portion.

According to the present invention, the wear caused by contact of the wiring member and/or the piping member with the robot itself and its peripheral equipment can be reduced by preventing the wiring member and/or the piping member from interfering with the robot itself and its peripheral equipment, allowing maintenance operations of the robot and the wiring member and/or the piping member to reduce. Further, the life of the robot and the wiring member and/or the piping member can be extended, permitting less running cost.

Furthermore, the time taken for the installation of the wiring member and/or the piping member can be reduced, permitting less cost required for alteration of a system including the robot.

BRIEF DESCRIPTION OF THE DRAWINGS

The foregoing and other objects and features of the invention will become apparent from the following description of preferred embodiments of the invention with reference to the accompanying drawings, in which.

DETAILED DESCRIPTION OF THE PREFERRED EMBODIMENTS

Figure 7:
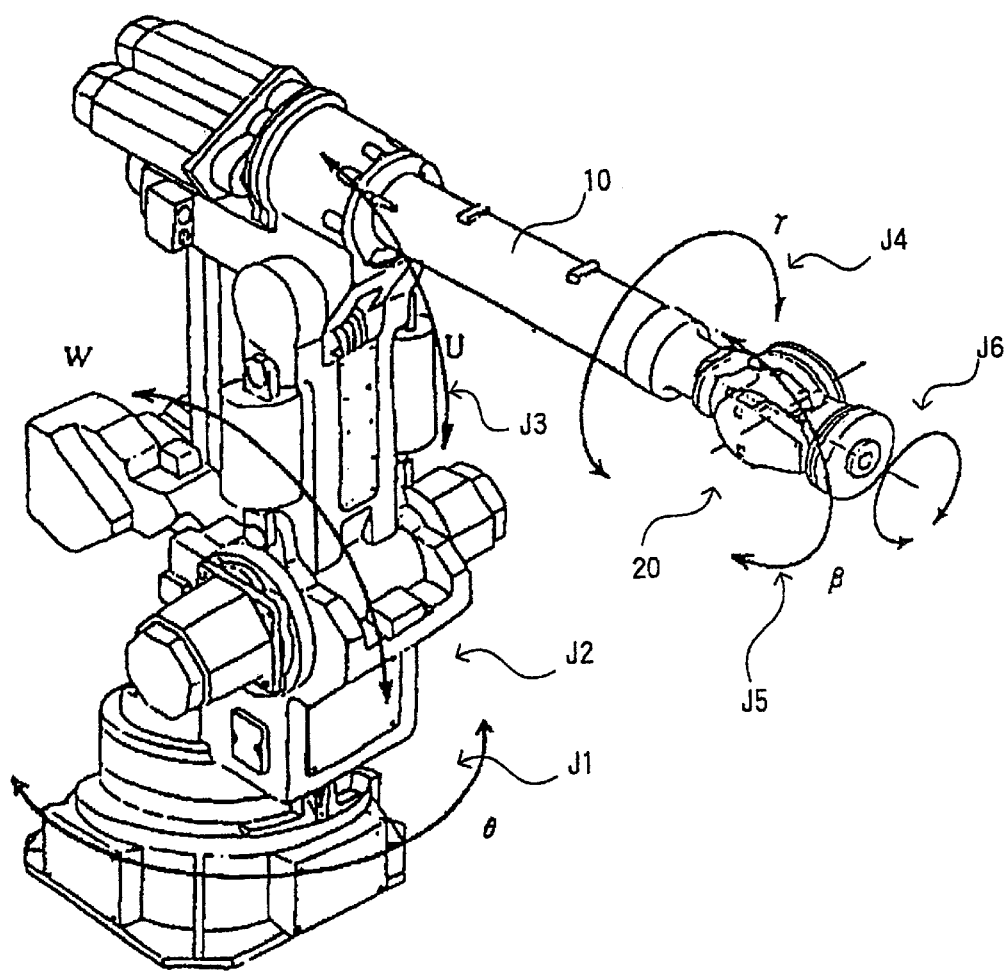
FIG. 7 is a view showing an industrial robot in the prior art.
Figure 8A:
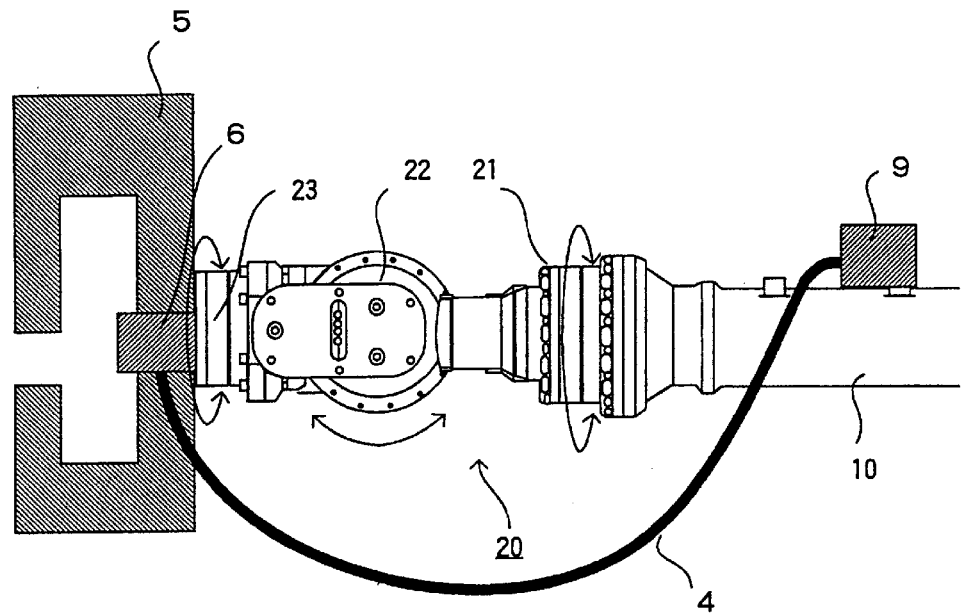
FIG. 8 illustrates the posture of a wiring member or a piping member connected to an end effector of a robot.
Figure 8B:
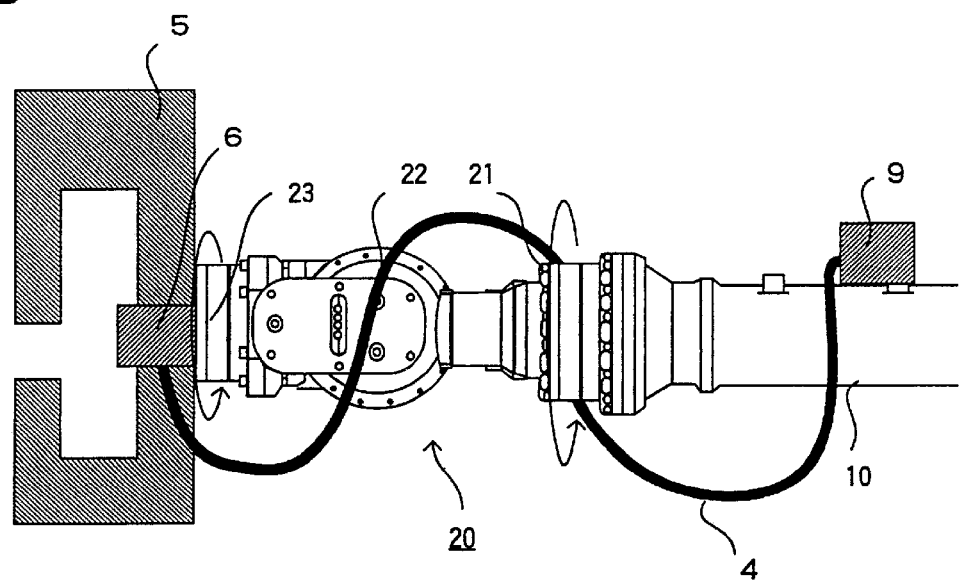

A robot having a guide device according to the present invention may be applied to an industrial robot. An industrial robot having six axes, for instance, may have the configuration as shown in FIG. 7. In the robot shown, arms actuated for turning or translation motion with a plurality of turning axes or translation axes are connected to a robot body fixed to an installation surface. An end effector may be mounted to a wrist 20 at the tip of the arm 10 so that it can be exchanged.

Figure 1A:
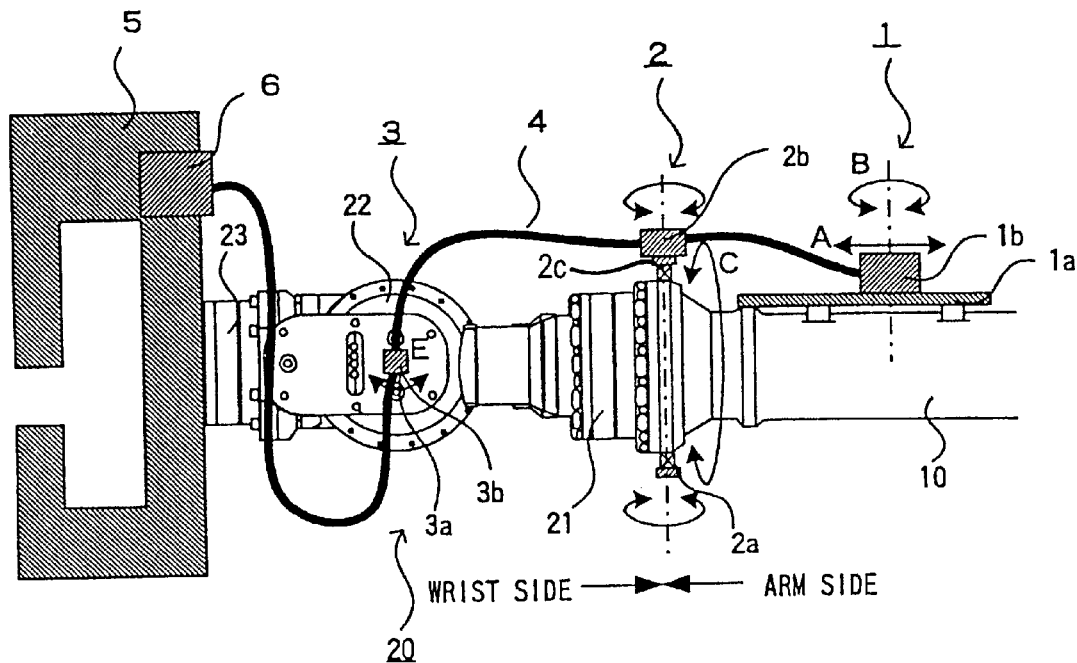
FIGS. 1A and 1B are views respectively showing the first embodiment of a guide device according to the present invention when applied to a wrist portion of a robot.

FIG. 1A shows the first embodiment of a guide device according to the present invention when applied to a wrist portion of the robot.

In FIG. 1A, the arm 10 has a wrist 20 mounted at the tip and having a plurality of turning axes. The wrist 20 has a first turning axis 21, a second turning axis 22 and a third turning axis 23 mounted in this order from the side of the arm 10, and the end effector 5 is mounted to the third turning axis 23 so that it can be exchanged. Incidentally, the first turning axis 21 and the second turning axis 22 and also the second turning axis 22 and the third turning axis 23 are placed respectively to cross axially each other at right angles.

The wrist 20 makes a swing motion according to a swing angle of the second turning axis 22.

The guide device shown in FIG. 1A comprises a first guide device 1, a second guide device 2 and a third guide device 3. These guide devices support the wiring member and/or the piping member 4 attached to the end effector 5 mounted at the tip of the wrist 20, and are also adapted to guide the wiring member and/or the piping member by varying the relation between the position of the wiring member and/or the piping member and that of each guide device according to the wrist motion.

The first guide device 1 has a base 1a also serving as a sliding unit and a turning clamp portion 1b and is placed on the arm 10. The second guide device 2 has a revolving unit 2a and a turning clamp portion 2b and is placed adjacent to the first turning axis 21 in the neighborhood of the wrist 20 of the arm 10. The third guide device 3 has a base 3a and a turning clamp portion 3b and is placed on the third turning axis 23.

The wiring member and/or the piping member 4 is clamped and is also supported as being capable of loose motion by the respective clamp portions of the first guide device 1, the second guide device 2 and the third guide device 3. The tip portion of the wiring member and/or the piping member is supported with the clamp portion 6 of the end effector 5 as being fixed in place. With the above configuration, the wiring member and/or the piping member can be displaced in association with the loose motion including the turning motion and the translation motion of each guide portion according to the wrist motion.

Figure 1B:
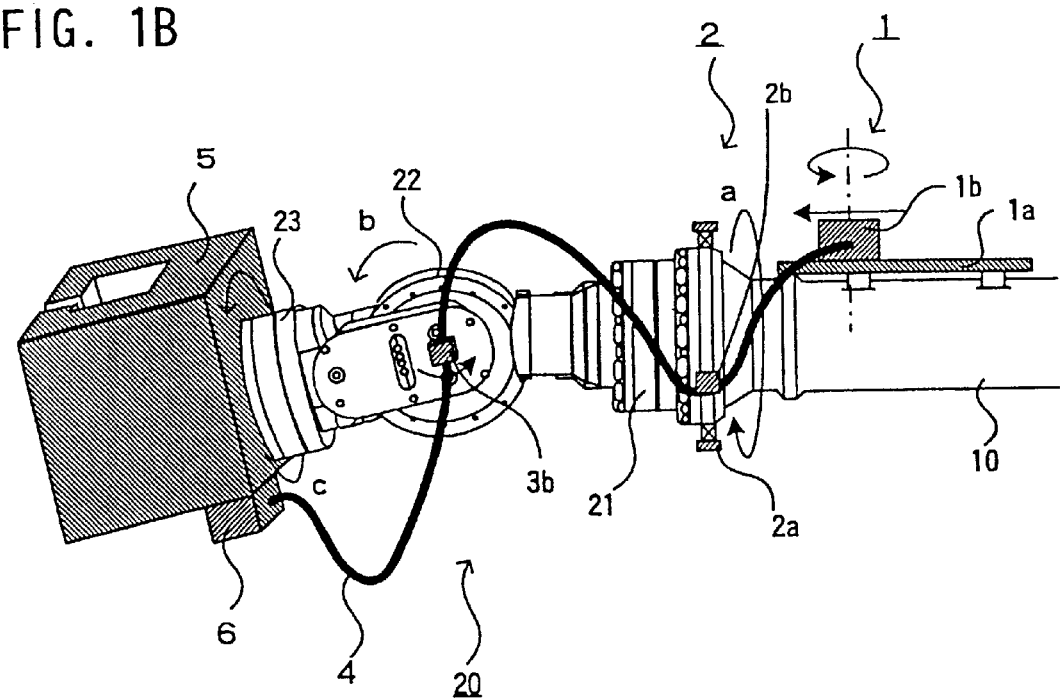

FIG. 1B shows the state, in which the first turning axis 21, the second turning axis 22 and the third turning axis 23 in the wrist portion of the robot shown in FIG. 1A are turned respectively in a direction a, a direction b and a direction c.

When each turning axis of the wrist 20 is turned, the respective clamp portions of the first guide device 1, the second guide device 2 and the third guide device 3 turn or perform the translation motion. As a result, the wiring member and/or the piping member 4 is held in place in a stable state without getting twisted round the arm 10 or the wrist 20. A description will now be given of the first guide device 1, the second guide device 2 and the third guide device 3 with reference to FIGS. 2A to 4C.

Figure 2A:
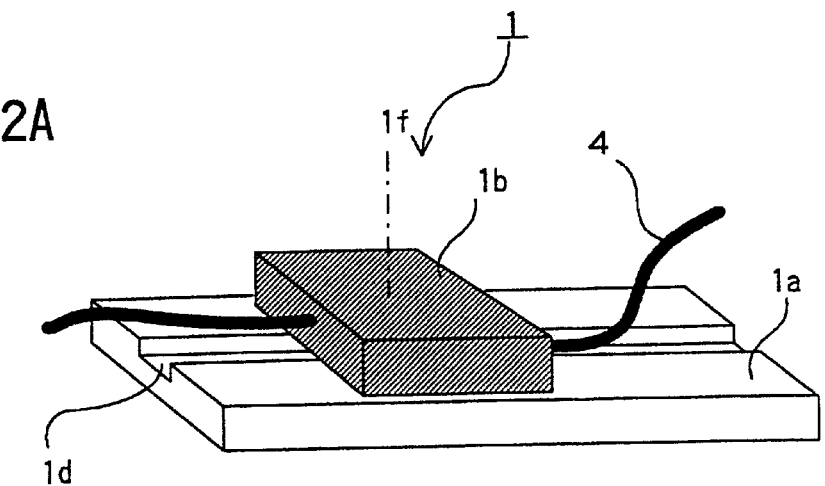
FIGS. 2A to 2C illustrate respectively the first embodiment of a clamp device for use in the guide device of FIG. 1A.

The first guide device 1 has the base 1a and the turning clamp portion 1b, as shown in FIG. 2A. The base 1a also serves as the sliding unit, which causes the turning clamp portion 1b to perform the translation motion. A guide such as a groove 1d formed in the base 1a, for instance, may be applied to perform the translation motion of the turning clamp portion. The turning clamp portion 1b is adapted to clamp the wiring member and/or the piping member 4 and is also configured to turn about an axis 1f. In the turning clamp portion 1b, the translation motion along the groove 1d and the turning motion about the axis 1f are caused by force applied from the wiring member and/or the piping member 4 clamped by the turning clamp portion 1b.

The direction of the axis 1f of the turning clamp portion 1b is configured to cross the direction of translation motion of the sliding unit at substantially right angles. With the above configuration, the force applied from the piping member 4 is decomposed into components in the directions of translation motion and turning, permitting a smooth displacement of the wiring member and/or the piping member 4.

Figure 2B:
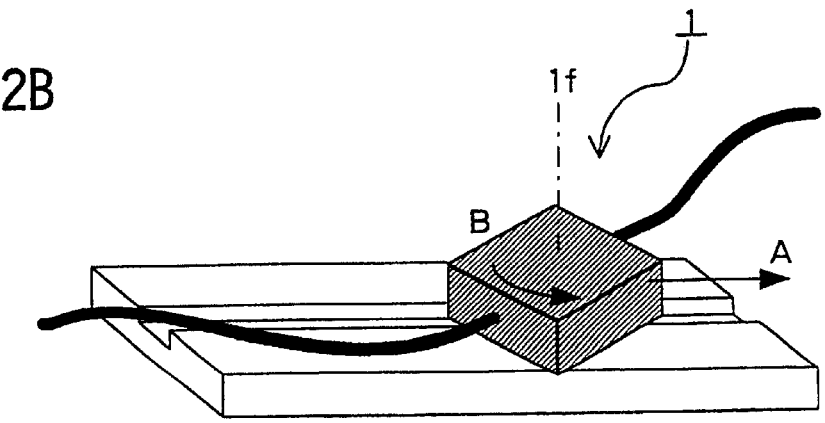
Figure 2C:
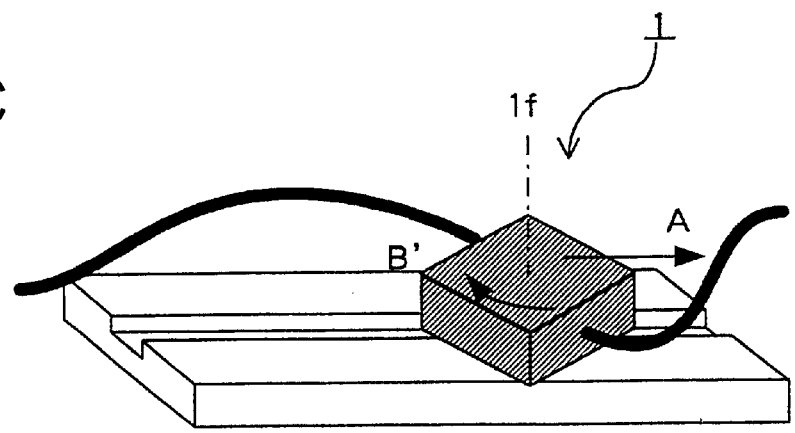

FIG. 2B shows the state, in which the turning clamp portion 1b of FIG. 2A performs the translation motion in the direction shown by an arrow A, and is also turned in the direction shown by an arrow B. In contrast with the case shown in FIG. 2B, FIGS. 2C shows the state, in which the turning clamp portion 1b of FIG. 2A performs the translation motion in the direction shown by an arrow A, and is also turned in the direction shown by an arrow B' (a direction opposite to the direction shown by the arrow B).

Figure 3A:
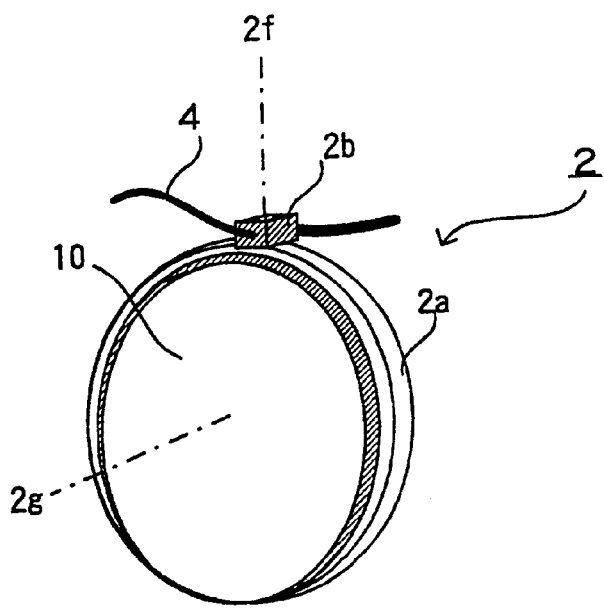
FIGS. 3A and 3B illustrate respectively the second embodiment of a clamp device for use in the guide device of FIG. 1A.

The second guide device 2 has the revolving unit 2a and the turning clamp portion 2b, as shown in FIG. 3A. The revolving unit 2a is adapted to turn the turning clamp portion 2b along the circumference of the arm 10. A bearing mechanism 2c provided on the revolving unit 2a, for instance, may be applied to perform the turning motion of the turning clamp portion. The turning clamp portion 2b is adapted to clamp the wiring member and/or the piping member 4 and is also configured to turn about an axis 2f. The turning motion of the revolving unit 2a and that of the turning clamp portion 2b are caused by force applied from the wiring member and/or the piping member 4 clamped by the turning clamp portion 2b.

An axis 2g of the revolving unit 2a crosses the axis 2f of the turning clamp portion 2b at substantially right angles. With the above configuration, the force applied from the piping member 4 may be decomposed into components in the turning directions of the revolving unit 2a and the turning clamp portion 2b, permitting a smooth displacement of the wiring member and/or the piping member 4.

Figure 3B:
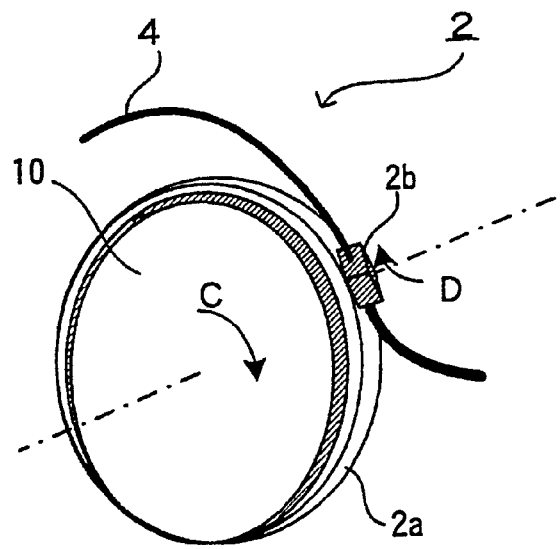

FIG. 3B shows the state, in which the revolving unit 2a of FIG. 3A revolves in the direction shown by an arrow C and the turning clamp portion 2b is turned in the direction shown by an arrow D.

Figure 4A:
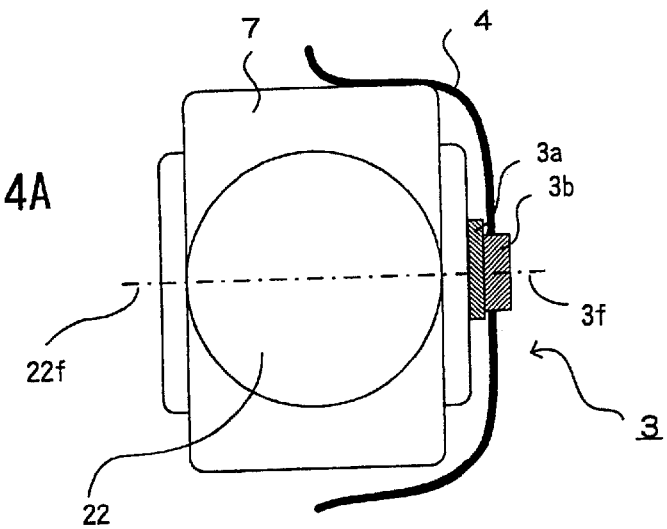
FIGS. 4A to 4C illustrate respectively the third embodiment of a clamp device for use in the guide device of FIG. 1A.

The third guide device 3 has the base 3a and the turning clamp portion 3b, as shown in FIG. 4A. The base 3a is fixed to the wrist or a wrist casing 7 to support the turning clamp portion 3b as being capable of turning. The turning clamp portion 3b is adapted to clamp the wiring member and/or the piping member 4 and is also configured to turn about an axis 3f. The turning motion of the turning clamp portion 3b is caused by force applied from the wiring member and/or the piping member 4 clamped by the turning clamp portion 3b.

The axis 3f of the turning clamp portion 3b is placed to cross the surface of the second turning axis 22 of the wrist 20 of the robot at substantially right angles such that the axis 3f may be aligned with or in parallel to the axis 22f of the second turning axis 22. With the above configuration, the force applied from the piping member 4 may be decomposed into components in the turning directions of the turning clamp portion 3b, permitting a smooth displacement of the wiring member and/or the piping member 4.

Figure 4B:
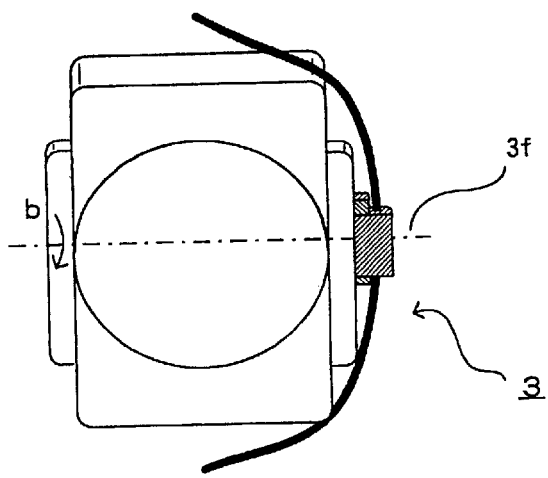
Figure 4C:
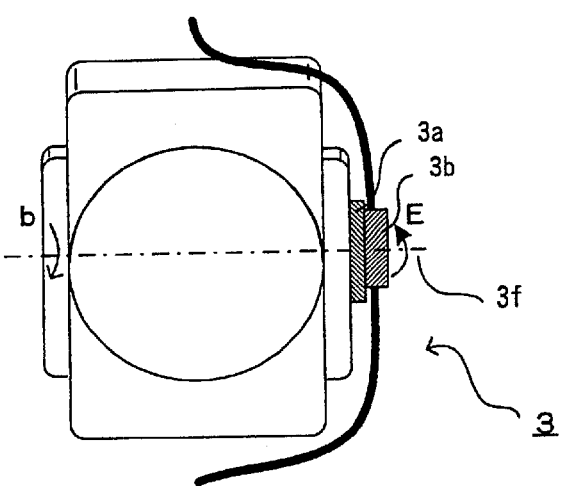

FIG. 4B shows the state, in which the second turning axis 22 of FIG. 4A has been pivoted about the axis 22f in the direction shown by an arrow b. FIG. 4C shows the state, in which the turning clamp portion 3b has been pivoted about the axis 3f in the direction shown by an arrow E according to the pivotal motion of the second turning axis 22.

Figure 5A:
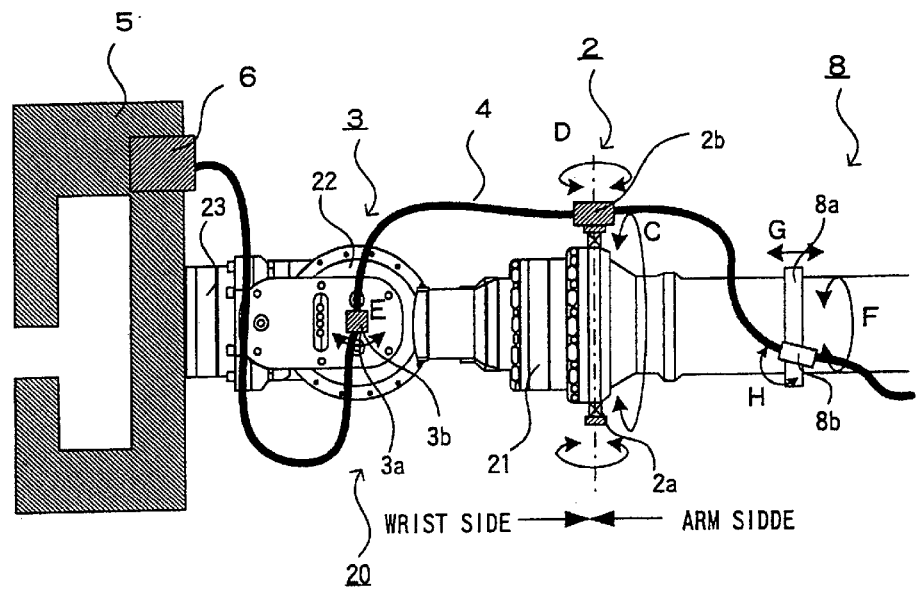
FIGS. 5A and 5B are views showing respectively the second embodiment of a guide device according to the present invention when applied to a wrist portion of a robot.

FIG. 5A shows the second embodiment of a guide device according to the present invention when applied to the wrist portion of the robot. The second embodiment is different from the first embodiment of FIG. 1A in that a fourth guide device is used instead of the first guide device 1. That is, the guide device of FIG. 5A comprises the second guide device, the third guide device and the fourth guide device.

The second guide device 2 has the revolving unit 2a and the turning clamp portion 2b and is placed adjacent to the first turning axis 21 in the neighborhood of the wrist 20 of the arm 10.

The third guide device 3 has the base 3a and the turning clamp portion 3b and is placed on the third turning axis 23.

The fourth guide device 8 has a movable unit 8a and a turning clamp portion 8b and is placed on the arm 10.

The wiring member and/or the piping member 4 is clamped and is also supported by the respective clamp portions of the fourth guide device 8, the second guide device 2 and the third guide device 3 in a manner such that it can move loosely. The tip portion of the wiring member and/or the piping member is fixedly supported with the clamp portion 6 of the end effector 5. With the above configuration, the wiring member and/or the piping member can be displaced in association with the loose motion including the turning motion and the translation motion of each guide portion according to the wrist motion.

Figure 5B:
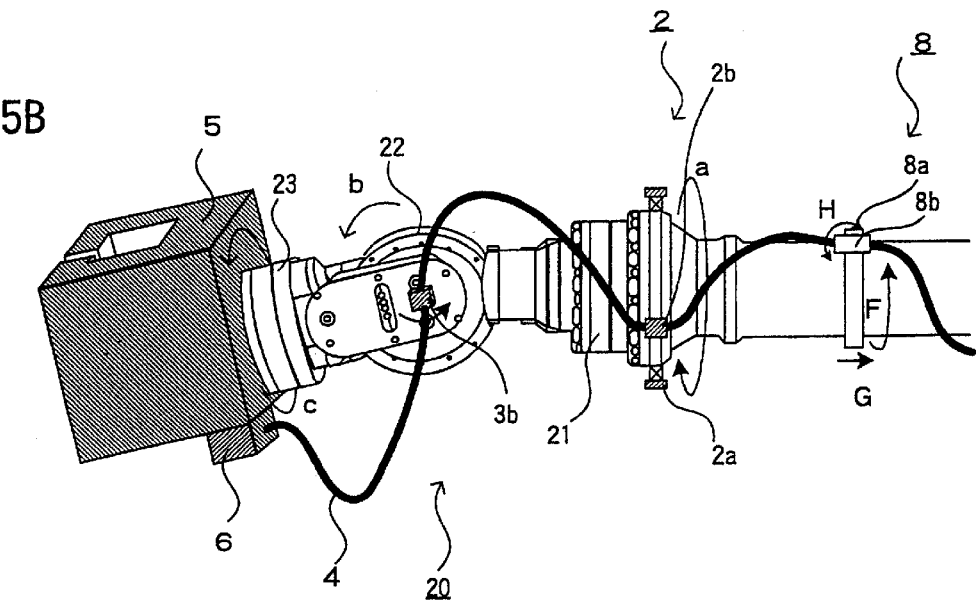

FIG. 5B shows the state, in which the first turning axis 21, the second turning axis 22 and the third turning axis 23 in the wrist portion of the robot shown in FIG. 5A has been turned in the direction a, the direction b and the direction c, respectively. When each turning axis of the wrist 20 is turned, the respective clamp portions of the fourth guide device 8, the second guide device 2 and the third guide device 3 turn (in the directions shown by arrows C, D, E, F and H in the drawing) or perform the translation motion (in the direction shown by an arrow G in the drawing). As a result, the wiring member and/or the piping member is held in place in a stable state without getting twisted round the arm 10 or the wrist 20.

Figure 6A:
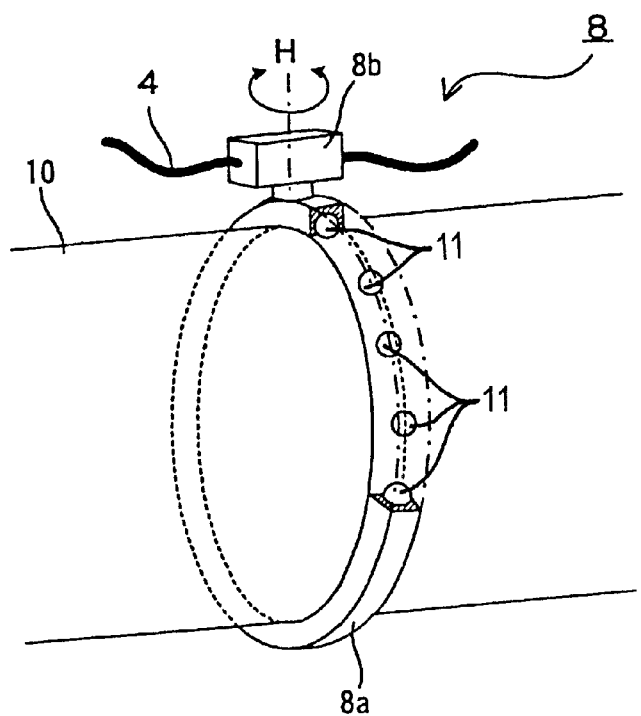
FIGS. 6A and 6B illustrate respectively the fourth embodiment of a clamp device for use in the guide device of FIG. 5A.

The fourth guide device 8. has the movable unit 8a and the turning clamp portion 8b, as shown in FIG. 6A. The movable unit 8a is adapted to cause the turning claim portion 8b to turn along the circumference (shown by an arrow F in the drawing) of the arm 10 and also to slind in the longitudinal direction (shown by an arrow G in the drawing) of the arm 10. Balls 11 provided in the movable unit 8a, for instance, are rolled on the cylindrical surface of the arm 10 to perform the turning and slide motions of the turning clamp portion 8b.

The turning clamp portion 8b is adapted to clamp the wiring member and/or the piping member 4 and is also configured to turn about an axis (as indicated by an arrow H in the drawing). The turning motions of the movable unit 8a and the turning clamp portion 8b and the slide motion of the movable unit 8a are caused by force applied from the wiring member and/or the piping member 4 clamped by the turning clamp portion 8b.

The axis of the movable unit 8a and that of the turning clamp portion 8b are placed to cross each other at substantially right angles. With the above configuration, the force applied from the wiring member and/or the piping member 4 is decomposed into components in the turning directions of the movable unit 8a and the turning clamp portion 8b and in the direction of the translation motion of the movable unit 8a, permitting a smooth displacement of the wiring member and/or the piping member 4.

Figure 6B:
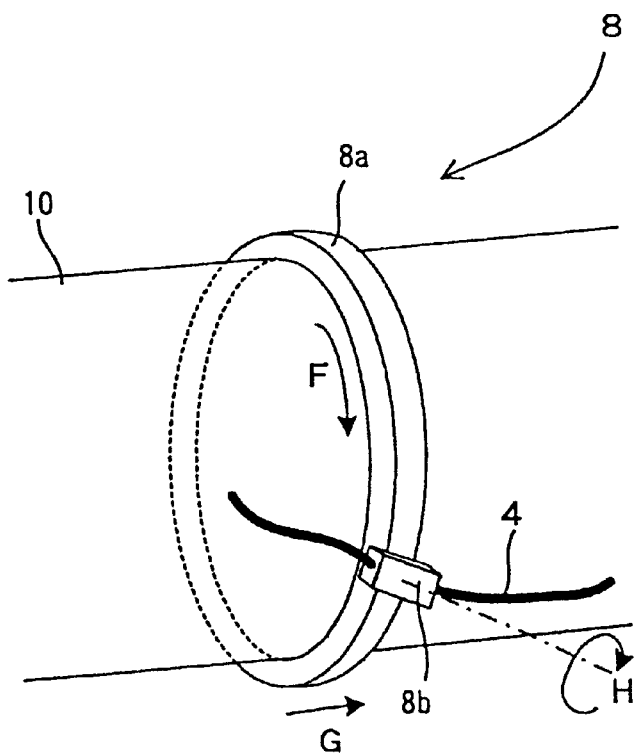

FIG. 6B shows the state, in which the movable unit 8a revolves in the direction shown by the arrow F and also slides in the direction shown by the arrow G, and the turning clamp portion 8b is turned in the direction shown by the arrow H.

As has been described in the foregoing, according to the present invention, it is possible to prevent the wiring member and/or the piping member from interfering with the robot itself or its peripheral equipment.

What is claimed is:

1. A guide device for a wiring member and/or a piping member connected to an end effector at the tip of a wrist of a robot via an arm of the robot, comprising:

a clamp device having a base and a clamp portion that clamps the wiring member and/or the piping member, wherein the clamp portion slides linearly in a first direction with respect to the base and turns about an axis perpendicular to the first direction and the clamp device is mounted to the robot by placing the base on the arm such that the slide direction of the clamp portion is substantially aligned with the longitudinal direction of the arm.

2. A guide device for a wiring member and/or a piping member, according to claim 1, further comprising a device that guides a wiring member and/or a piping member that comprises:

a clamp device having a revolving unit fitted to the circumference of the arm that pivots in the circumferential direction of the arm; and a clamp portion that clamps the wiring member and/or the piping member, located on the circumference of the revolving unit that turns about an axis in the radial direction of the revolving unit.

3. A robot, comprising:

at least one of the guide devices according to claim 1.

4. A guide device for a wiring member and/or a piping member connected to an end effector at the tip of a wrist of a robot via an arm of the robot, comprising:

a clamp device having a ring-shaped movable unit fitted to the circumference of the arm that revolves in a circumferential direction of the arm, and that slides in a direction parallel to the axial center of the arm, and a clamp portion that clamps the wiring member and/or the piping member, located on the circumference of the ring-shaped movable unit and that turns about an axis in a radial direction of the ring-shaped movable unit.

5. A robot, comprising:

at least one of the guide devices according to claim 4.

6. A guide device for a wiring member and/or a piping member, according to claim 4, further comprising a device that guides a wiring member and/or a piping member that comprises:

a clamp device having a revolving unit fitted to the circumference of the arm that pivots in the circumferential direction of the arm; and a clamp portion that clamps the wiring member and/or the piping member, located on the circumference of the revolving unit that turns about an axis in the radial direction of the revolving unit.

* * * * *